Sept. 21, 1937.　　　　　S. C. PLATT　　　　2,093,480
CAMERA
Filed Nov. 7, 1932　　　　2 Sheets-Sheet 1
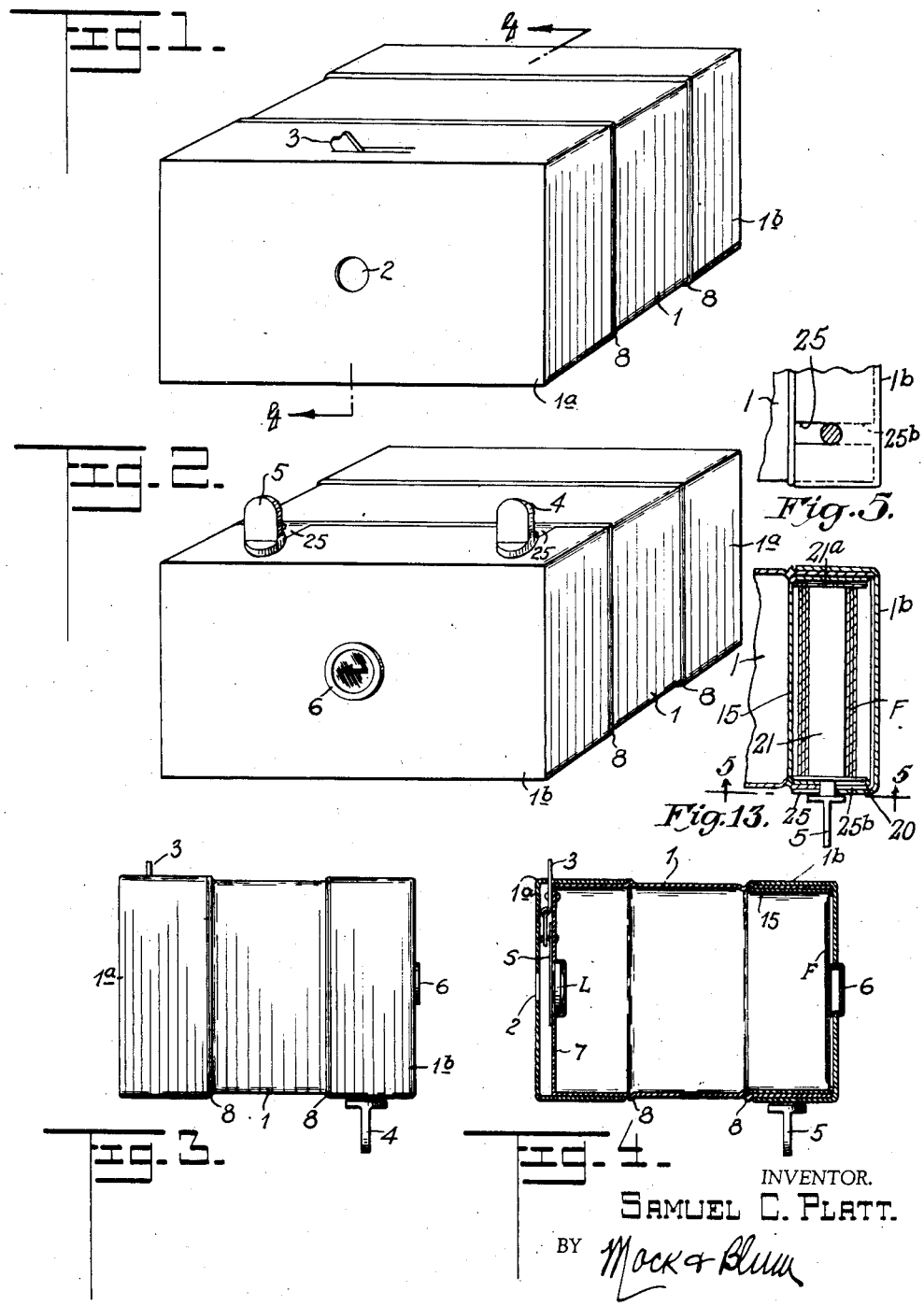
INVENTOR.
SAMUEL C. PLATT.
BY Mock & Blum
ATTORNEYS Sept. 21, 1937.　　　　S. C. PLATT　　　　2,093,480
CAMERA
Filed Nov. 7, 1932　　　　2 Sheets-Sheet 2
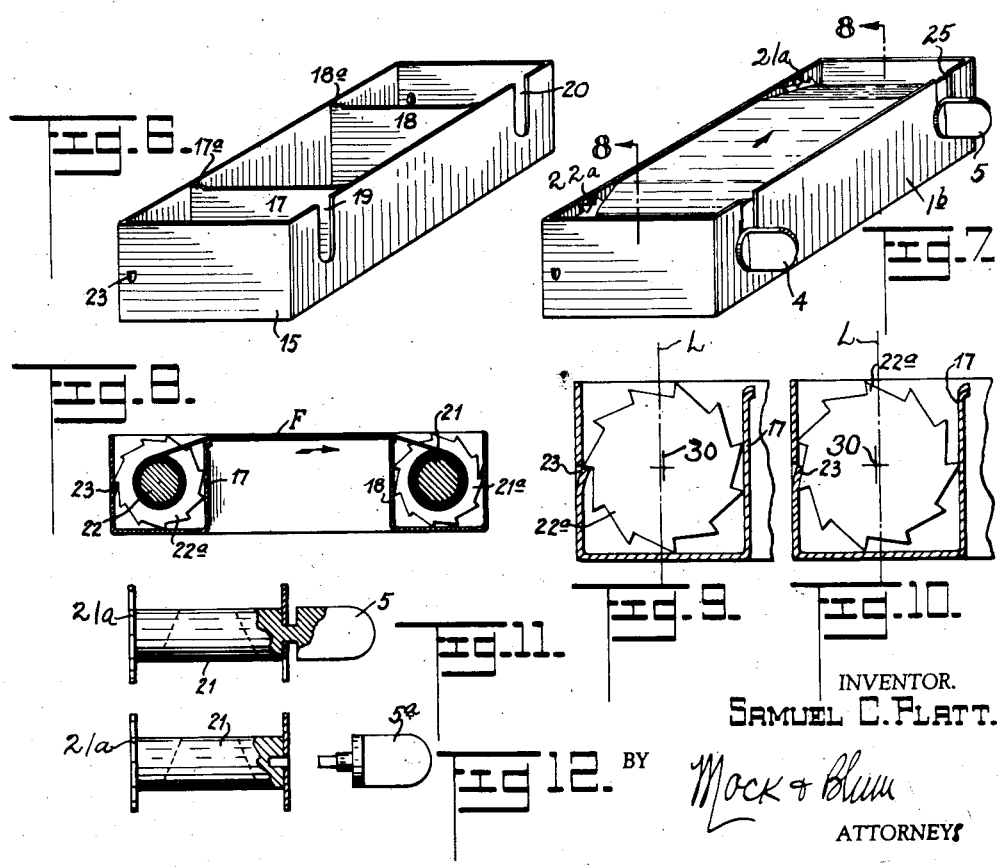
INVENTOR.
SAMUEL C. PLATT.
BY Mock & Blum
ATTORNEYS Patented Sept. 21, 1937

2,093,480

UNITED STATES PATENT OFFICE 2,093,480

CAMERA

Samuel C. Platt, New York, N. Y., assignor to Universal Camera Corporation, New York, N. Y., a corporation of New York Application November 7, 1932, Serial No. 641,503

6 Claims. (Cl. 242—71)

My invention relates to a new and improved camera.

One of the objects of my invention is to provide an improved camera of very simple and efficient design, which can be manufactured at very low cost.

Another object of my invention is to provide various improved sub-combinations for a camera, such as an improved film holder.

Another object of my invention is to provide a film holder of simple and compact form which can be made up and sold as a unit, and which can be inserted into the camera as a unit.

Another object of my invention is to provide a film holder of simple and improved design, by means of which the film is held taut, and by means of which any backward movement of the film is prevented.

Other objects of my invention will be set forth in the following description and drawings which illustrate a preferred embodiment thereof, it being understood that the above general statement of the objects of my invention is intended merely to generally explain the same and not to limit it in any manner.

Fig. 1 is a front perspective view of the improved camera.

Fig. 2 is a rear perspective view, the camera also having been reversed in order to show the projecting handles for moving the film.

Fig. 3 is a side elevation of Fig. 1.

Fig. 4 is a sectional view on the line 4—4 of Fig. 1.

Fig. 5 is a cross-sectional view taken on line 5—5 of Fig. 13.

Fig. 6 is a perspective view of the empty film holder.

Fig. 7 is a view similar to Fig. 6 showing the film in position.

Fig. 8 is a sectional view on the line 8—8 of Fig. 7.

Figs. 9 and 10 are enlarged sectional views, in elevation illustrating certain of the devices for controlling the movement of the film.

Fig. 11 is an elevation, partially in section of one of the film rollers.

Fig. 12 is a view similar to Fig. 11, and showing a slightly different embodiment.

Fig. 13 is a partial cross-sectional view similar to the right hand portion of Fig. 4 but taken through one of the film spools.

The camera comprises a box-like body 1, which is made of metal or any other suitable material. The body 1 of the camera is provided with ribs 8.

Caps 1a and 1b are slidably and frictionally fitted over the ends of the body 1, so that said caps 1a and 1b can be readily applied and removed. The close frictional fit between the body 1 and said caps makes it unnecessary to provide any special devices for holding the caps in position. When the caps are in position, their inner ends abut the ribs 8.

The front wall of the cap 1a is provided with an aperture 2 which is aligned with the lens L. This lens L is suitably secured to the front wall 7 of the body 1. The top wall of the cap 1a is provided with an aperture through which projects the lever 3, by means of which the shutter is operated.

Referring to Fig. 6, the film holder 15 is a box-like device or cradle which is made of metal or any other suitable material. One of the side walls of said holder 15 is provided with recesses 19 and 20. The film holder is also provided with lateral partitions 17 and 18 which are formed by cutting and upwardly bending portions of the bottom wall of the holder 15. The partitions 17 and 18 have raised shoulders 17a and 18a at their lateral ends. The film F is guided on the tops of these raised ends 17a and 18a so that the central part of the film does not contact with any rigid surfaces, when the film is moved. This serves to minimize the scratching of the film.

The tops of the members 17 and 18, including the raised ends 17a and 18a are also formed with a blunt contour, as shown in Figs. 9 and 10, in order to further minimize scratching of the film.

The film F is wound upon a magazine roller 22 which is suitably connected to a ratchet 21a. The take-up roller 21 is provided with a similar ratchet 22a. The magazine and take-up rollers have the identical shape, said shape being illustrated in Fig. 11. The end flanges of said rollers or spools 21 and 22 fit snugly and frictionally between the side walls of the holder 15, and the outer faces of said flanges of the spools may be provided if desired with cloth or leather or other frictional material. Hence, the construction of the device provides a frictional resistance to the free turning of the spools 21 and 22 and it is sufficient to merely place said spools within the compartments which are formed by the end walls of the holder 15 and the members 17 and 18.

As shown in Fig. 7, the ratchets 21a and 22a may form the end faces of their respective spools.

The end walls of the holder 15 are provided with indentations 23 so that part of each said end wall is inwardly struck, as shown in Figs. 9 and 10, in order to form a pawl which will permit the spools 21 and 22 to turn only in the clockwise directions as indicated by the arrows in Figs. 7 and 8.

The ratchets 21a and 22a are of identical construction. Referring to Figs. 9 and 10, each said ratchet has an odd number of teeth and it will be noted that the tip of each tooth is diametrically opposite to a point which is substantially midway between the points of an opposite tooth. For example, if a horizontal diameter is drawn through the center of the ratchet shown in Fig. 10, the right-hand end of this diameter will coincide with the tip of a tooth and the left-hand end of this diameter will be located midway between the ends of the opposite tooth.

Hence, the greatest diameter of the ratchet is substantially the same as the shortest or horizontal longitudinal distance between the end walls of the compartment in which said ratchet is located. This makes it possible to turn the ratchet without causing the outer tips of its teeth to bind against the end walls of said compartment, one of said end walls being the partition 17 or 18, as the case may be.

Furthermore, and as shown in Figs. 9 and 10, the ratchets have a limited to and fro longitudinal movement as they are turned, in order to permit the outer tips of their teeth to pass the pawl member 23. In Figs. 9 and 10 the lines L indicate the median longitudinal planes of the compartments in which the spool 22 is located, and the crosses 30 indicate the central points of the ratchets.

Referring to Fig. 9, when one of the teeth of the ratchets abuts the indentation 23, the central point of the ratchet is to the right of the line L.

In the intermediate position shown in Fig. 10, the central point of the ratchet is to the left of the line L. The member 23 has sufficient spring or resilience in order to permit the turning of the ratchet, if this is desired, although the parts may be made of relatively rigid material due to the construction specified.

As shown in Fig. 11, the handle 5 may be integral with the take-up roller 21.

As shown in Fig. 12, said handle 5a may be separated from its roller and said handle 5a may have a suitable squared shank which fits into a corresponding recess in the take-up roller. The roller 22 is provided with a similar handle 4.

The cap 1b is provided with slots 25 at its bottom so as to enable the bottom of said cap 1b to be slid underneath the heads of the handles 4 and 5.

While I have shown a complete camera, it is clear that the invention includes valuable subcombinations which are separately claimed herein, attention being particularly called to the simple and improved film holder.

The exposed part of the film is located between the partitions 17 and 18.

The cap 1b is provided with a suitable window 6, through which can be observed the arrows, numerals, or the like, which identify the respective film sections.

Various conventional parts and attachments can be added to the camera without departing from the invention, as I have illustrated the device in its simplest and cheapest form.

I do not wish to be limited to the use of ratchet devices for controlling the movement of the film as said devices include only one embodiment of the invention.

While I have shown the use of solid partitions 17 and 18, said partitions could have any form, and whenever I refer to a compartment of the holder, I generally include any means whereby the roller can be turned about its axis, and the roller can be shifted in a direction perpendicular to its axis.

When all the film in a holder has been exposed, the cap 1a is removed, the film holder is removed, and an additional film holder can be inserted. Said film holder frictionally fits within the member 1.

The partitions 17 and 18 may be relatively springy and bendable around their bottom edges so as to facilitate the relative shifting of the central axis of the roller which is illustrated in Figs. 9 and 10.

As illustrated in Figs. 13 and 5 of the drawings, the edge of the casing receiving the cover 1b is formed with notches 25b registering with the notches 19 and 20 of the cradle 15 and overlapping the notches 25 in the cover and forming therewith bearing openings for receiving the portion of the spool interconnecting the handle 5 with the spindle 21. With this construction, when the spools have been placed within the cradle, the cradle may be slidably moved into the rear end of the casing, the notches 25b permitting the insertion of the cradle. Upon applying the cover thereafter, bearings are formed for the spindles, since the ends of the notches 19, 20, 25b, and 25 are of semicircular shape.

I have shown a preferred embodiment of my invention, but it is clear that numerous changes and omissions can be made without departing from its spirit.

I claim:

1. A camera comprising a casing having rear edges formed with notches, film spool spindles mounted within the rear of the casing and extending through said notches and a rear cover for said casing having flanges overlapping said rear edges of said casing and formed with notches overlapping said first notches and cooperating therewith to form bearings for said spindles.

2. In a camera, a casing having a rear edge formed with a notch, a film spool comprising a spindle having a pair of parallel discs and a portion extending beyond one of said discs and formed with a knob, the portion of the spindle between the knob and the disc adjacent thereto being received within said notch, and a rear cover for said casing having a flange overlapping the notched edge portion of said casing and formed with a notch cooperating with the first notch to form a bearing for said portion of said spindle.

3. In a camera, a casing having a rear edge formed with a notch, a film spool comprising a spindle having a pair of parallel discs and a portion extending beyond one of said discs and formed with a knob, the portion of the spindle between the knob and the disc adjacent thereto being received within said notch and a rear cover for said casing having a flange overlapping the notched edge portion of said casing and formed with a notch cooperating with the first notch to form a bearing for said portion of said spindle, one of said discs having ratchet teeth on a periphery thereof and means cooperating with said ratchet teeth to permit the spindle to be rotated in one direction only.

4. A camera comprising a casing open at the rear, a cover for the rear end of said casing having a rear wall and side walls telescoped with the rear end of said casing, the rear edge of said casing and said cover being formed with overlapping notches cooperating to form a bearing opening and a film spool spindle extending into the casing and journaled in said bearing opening.

5. A camera comprising a casing open at the rear, a cover for the rear end of said casing having a rear wall and side walls, the rear edges of said casing and said cover being formed with notches cooperating to form a bearing opening, a film spool spindle extending into the casing and journaled in said bearing opening, and a handle fixed to said spindle disposed exteriorly of said casing and removable with said spindle from said casing.

6. A camera comprising a casing open at the rear, a cover for the rear end of said casing having a rear wall and side walls, the rear edges of said casing and said cover being formed with notches cooperating to form a bearing opening, a film spool spindle extending into the casing and journaled in said bearing opening, and a handle fixed to said spindle disposed exteriorly of said casing and removable with said spindle from said casing, a disc on said spindle having peripheral teeth, and pawl means coacting with said teeth to prevent turning of the roller in one direction.

SAMUEL C. PLATT.